United States Patent
Sugaya et al.

(10) Patent No.: US 6,844,396 B2
(45) Date of Patent: *Jan. 18, 2005

(54) ACRYLIC RESIN COMPOSITION

(75) Inventors: Takahiko Sugaya, Houston, TX (US); Riichi Nishimura, League City, TX (US); Kazuhisa Tajima, Kobe (JP)

(73) Assignees: Kaneka Corporation, Osaka (JP); Kaneka Texas Corporation, Pasadena, CA (US)

( * ) Notice: Subject to any disclaimer, the term of this patent is extended or adjusted under 35 U.S.C. 154(b) by 166 days.

This patent is subject to a terminal disclaimer.

(21) Appl. No.: 10/229,277

(22) Filed: Aug. 28, 2002

(65) Prior Publication Data

US 2004/0043235 A1 Mar. 4, 2004

(51) Int. Cl.⁷ .................. C08G 63/48; C08G 63/91; C08L 31/02; C08L 33/04; C08L 51/00
(52) U.S. Cl. .............. 525/70; 525/71; 525/80; 525/85; 525/222; 525/308; 525/309
(58) Field of Search .................. 525/70, 71, 80, 525/85, 222, 308, 309

(56) References Cited

U.S. PATENT DOCUMENTS

| | | | | |
|---|---|---|---|---|
| 5,063,259 A | * | 11/1991 | Wanat et al. | 523/201 |
| 5,318,737 A | * | 6/1994 | Trabert et al. | 264/173.16 |
| 5,777,034 A | * | 7/1998 | Shah et al. | 525/228 |
| 6,555,245 B2 | * | 4/2003 | Tajima et al. | 428/520 |
| 2002/0123568 A1 | * | 9/2002 | Tajima et al. | 525/85 |

* cited by examiner

*Primary Examiner*—Nathan M. Nutter
(74) *Attorney, Agent, or Firm*—Westerman, Hattori, Daniels & Adrian, LLP

(57) ABSTRACT

An acrylic resin composition with excellent impact resistance, weatherability, processability and low gloss is provided. The acrylic resin composition comprises, (A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, the (co)polymer having a specific viscosity of at least 0.5 (solvent: toluene, concentration: 0.4%, temperature: 30° C.), wherein a polymer layer obtained in one of the steps contains at least 72% by weight of methyl methacrylate, has a specific viscosity of at least 0.5 and makes up at least 55% by weight of the total weight of the high molecular weight acrylic (co)polymer (A); (B) 0 to 80 parts by weight of an acrylic (co)polymer containing 50 to 100% by weight of methyl methacrylate and 0 to 50% by weight of a copolymerizable monomer, the acrylic (co)polymer having a specific viscosity of less than 0.5; (C) 10 to 90 parts by weight of an impact modifier with a multilayer structure, wherein the total of (A), (B) and (C) is 100 parts by weight and the composition has a melt flow index of 0.35 g/10 minutes to 1.4 g/10 minutes (230° C., 3.8 kg load).

12 Claims, No Drawings

ACRYLIC RESIN COMPOSITION

TECHNICAL FIELD

The present invention relates to a low gloss acrylic resin composition for extrusion molding. More specifically, it concerns an acrylic resin composition comprising a high molecular weight acrylic (co)polymer as a gloss reducing agent.

BACKGROUND ART

Acrylic resin has high gloss and various applications utilizing this characteristic have been developed. On the other hand, low gloss is sometimes preferred for the purpose of obtaining a composed feeling, or reducing the plastic-like quality, and the market requests low gloss products for some types of building material for outer walls, or housing for lighting.

In current gloss reducing technology, the addition of organic or inorganic gloss reducing agents and embossing process of surfaces are generally attempted.

Although inorganic gloss reducing agents such as silica and talc exist, dispersion within the resin which is the matrix, is poor, resulting in a decrease in physical property such as diminished impact resistance.

Because embossing process of surfaces is insufficient in its gloss reducing effect and is difficult in fine adjustment, ultimately its use together with gloss reducing agents is mainstream.

There are several types of organic gloss reducing agents and crosslinked polymers with an average particle diameter of a few $\mu$m to a few hundred $\mu$m are most widely used. However, it is difficult to obtain the particle diameter of a few $\mu$m to a few dozen $\mu$m, which is most effective in reducing the gloss of acrylic resin, and even when the amount added is increased, the result ends in saturation, thus falling short of the desired level.

Linear or radial structure polymers of low compatibility with matrixes may be given as other organic gloss reducing agents. The addition of styrene block copolymer such as SBS (styrene-butadiene-styrene block copolymer), SB (styrene-butadiene block copolymer) and SEBS (styrene-ethylene-butylene-styrene block copolymer), olefin rubber such as EPR (ethylene-propylene rubber) and EPDM (ethylene-propylene-diene rubber), NBR (nitrile rubber), an ionomer such as ethylene-acrylic acid (metallic salt) copolymer are known. However, they are not desirable as they bring about a decrease in physical properties such as weatherability or impact resistance.

As stated above, obtaining a low gloss effect while maintaining the physical properties is extremely difficult, and in present conditions, a low gloss acrylic resin which can sufficiently meet the market's demands does not exist.

The present invention provides an acrylic resin with excellent low gloss in addition to impact resistance, weatherability, and processability, which was not possible from prior arts, due to the aforesaid conditions.

DISCLOSURE OF INVENTION

As a result of intensive studies to solve the above problems, it has been found that an acrylic resin with excellent low gloss in addition to impact resistance, weatherability, and processability can be obtained by mixing a high molecular weight acrylic (co)polymer having a specific viscosity of at least 0.5 (solvent: toluene, concentration: 0.4%, temperature: 30° C.) and containing at least 72% by weight of methyl methacrylate, an acrylic (co)polymer having a specific viscosity of less than 0.5, and an impact modifier, and the present invention has been accomplished.

That is, the present invention relates to an acrylic resin composition comprising, (A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, the (co)polymer having a specific viscosity of at least 0.5 (solvent: toluene, concentration: 0.4%, temperature: 30° C.), wherein a polymer layer obtained in one of the steps contains at least 72% by weight of methyl methacrylate, has a specific viscosity of at least 0.5 and makes up at least 55% by weight of the total weight of the high molecular weight acrylic (co)polymer (A);

(B) 0 to 80 parts by weight of an acrylic (co)polymer containing 50 to 100% by weight of methyl methacrylate and 0 to 50% by weight of a copolymerizable monomer, the acrylic (co)polymer having a specific viscosity of less than 0.5;

(C) 10 to 90 parts by weight of an impact modifier with a multilayer structure, wherein the total of (A), (B) and (C) is 100 parts by weight and the composition has a melt flow index of 0.35 g/10 minutes to 1.4 g/10 minutes (230° C., 3.8 kg load).

It is preferable that the composition comprises 12 to 37 parts by weight of the high molecular weight acrylic (co)polymer (A), 25 to 75 parts by weight of the acrylic (co)polymer (B) and 15 to 70 parts by weight of the impact modifier (C).

It is preferable that the composition comprises 15 to 35 parts by weight of the high molecular weight acrylic (co)polymer (A) 25 to 65 parts by weight of the acrylic (co)polymer (B) and 20 to 60 parts by weight of the impact modifier (C).

It is preferable that the high molecular weight acrylic (co)polymer (A) has a specific viscosity of at least 0.6, and the composition comprises 15 to 35 parts by weight of the high molecular weight acrylic (co)polymer (A) in which a polymer layer obtained in one of the steps has a specific viscosity of at least 0.6, 25 to 65 parts by weight of the acrylic (co)polymer (B) and 20 to 60 parts by weight of the impact modifier (C), wherein the total of (A), (B) and (C) is 100 parts by weight.

It is preferable that the high molecular weight acrylic (co)polymer (A) is a one-step or multi-step polymer, and the polymer obtained in one of the steps has a specific viscosity of at least 0.6 and makes up 70% by weight of the total weight of the high molecular weight acrylic (copolymer (A).

It is preferable that the high molecular weight acrylic (co)polymer (A) is a multi-step polymer and the step include at least two steps.

It is preferable that the impact modifier (C) is a polymer having two layer structure prepared by polymerizing 80 to 5 parts by weight of a monomer mixture comprising 50 to 100% by weight of a (meth)acrylic ester and 50 to 0% by weight of another copolymerizable monomer in the presence of 20 to 95 parts by weight of a crosslinked acrylic rubber, wherein the total of the monomer mixture and the crosslinked acrylic rubber is 100 parts by weight.

Preferably, the impact modifier (C) is a polymer having three layer structure prepared by polymerizing 10 to 60 parts by weight of a monomer mixture comprising 50 to 100% by weight of a (meth)acrylic ester and 50 to 0% by weight of a copolymerizable monomer in the presence of a polymer having two layer structure, the polymer having two layer structure being obtained by polymerizing 30 to 80 parts by weight of a monomer mixture comprising 50 to 99.9% by weight of an acrylic ester, 49.9 to 0% by weight of a copolymerizable monomer and 0.1 to 5% by weight of crosslinkable monomer in the presence of 10 to 40 parts by weight of an inner layer polymer obtained by polymerizing 40 to 99.9% by weight of methyl methacrylate, 59.9 to 0% by weight of another copolymerizable monomer and 0.1 to 5% by weight of crosslinkable monomer, wherein the total of the monomer mixtures and the inner polymer is 100 parts by weight.

The present invention also relates to a molding for capstock comprising the resin composition; a molding for capstock obtained by extruding the composition as a capstock by using a multi-manifold die; and a siding panel and a window profile comprising a capstock obtained from the composition and a substrate made of a vinyl chloride resin.

BEST MODE FOR CARRYING OUT THE INVENTION

The present invention relates to an acrylic resin composition comprising, (A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, the (co)polymer having a specific viscosity of at least 0.5 (solvent: toluene, concentration: 0.4%, temperature: 30° C.), wherein a polymer layer obtained in one of the steps contains at least 72% by weight of methyl methacrylate, has a specific viscosity of at least 0.5 and makes up at least 55% by weight of the total weight of the high molecular weight acrylic (co)polymer (A);

(B) 0 to 80 parts by weight of an acrylic (co)polymer containing 50 to 100% by weight of methyl methacrylate and 0 to 50% by weight of a copolymerizable monomer, the acrylic (co)polymer having a specific viscosity of less than 0.5;

(C) 10 to 90 parts by weight of an impact modifier with a multilayer structure, wherein the total of (A), (B) and (C) is 100 parts by weight and the composition has a melt flow index of 0.35 g/10 minutes to 1.4 g/10 minutes (230° C., 3.8 kg load).

Below is a description of high molecular weight acrylic (co)polymer (A).

The high molecular weight acrylic (co)polymer (A) can be obtained by copolymerizing methyl methacrylate with a monomer copolymerizable therewith. Specifically, it can be obtained by copolymerrizing 72 to 100% by weight of methyl methacrylate and 0 to 28% by weight of a copolymerizable monomer. The gloss reducing effect cannot be sufficiently obtained when the amount of methyl methacrylate is less than 72% by weight. It is desirable that the amount of methyl methacrylate is 80 to 100% by weight, more preferably 85 to 95% by weight. The greater the content of methyl methacrylate is, the greater the gloss reducing effect.

Monomers copolymerizable with methyl methacrylate include, for instance, aromatic vinyl compounds, acrylic esters, methacrylic esters other than methyl methacrylate, (meth)acrylic acid, acrylonitrile and the like.

Examples of the aromatic vinyl compounds are, for instance, styrene, α-methylstyrene, chlorostyrene, p-hydroxystyrene and the like.

Examples of the (meth)acrylic esters are, for instance, ethyl (meth)acrylate, butyl (meth)acrylate, n-butyl (meth) acrylate, n-octyl (meth)acrylate 2-ethylhexyl (meth) acryalte, 2-hydroxyethyl (meth)acrylate, 4-hydroxyethel (meth)acrylate, glycidyl (meth)acrylate and the like. Among these copolymerizable monomers, because high molecular weight polymers can be obtained with ease in manufacturing and also superior weatherability is attained, (meth)acrylic esters are the most desirable.

These copolymerizable monomers may be used alone or in combination with two or more kinds.

It is desirable that the specific viscosity of the high molecular weight (co)polymer (A) be at least 0.5. The gloss reducing effect cannot be sufficiently obtained when the specific viscosity is less than 0.5. The specific viscosity is more preferably at least 0.6, and most preferably at least 0.65.

The specific viscosity was acquired by measuring the viscosity of a toluene solution containing 0.4% by weight (solid content) of the obtained polymer.

The high molecular weight acrylic (co)polymer (A) is a one-step or multi-step polymer in which a polymer layer obtained in one of the steps contains at least 72% by weight of methyl methacrylate, has a specific viscosity of at least 0.5, and makes up at least 55% by weight of the total weight of the (co)polymer (A).

The amount of the methyl methacrylate in the largest step in (co)polymer (A) more preferably is at least 80% by weight, and the upper limit preferably 95% by weight. A gloss reducing effect cannot be sufficiently obtained when the amount of the methyl methacrylate is less than 72% by weight. When the amount exceeds the upper limit of 95% by weight, collection as powder when manufacturing tends to become difficult.

Furthermore, the specific viscosity is preferably at least 0.6, most preferably at least 0.65. When the specific viscosity is less than 0.5, a gloss reducing effect cannot sufficiently be obtained.

In addition, it is desirable that the amount of methyl methacrylate in the largest step in (co)polymer (A) is at least 70% by weight, with an upper limit of 95% by weight, of the total weight of the high molecular weight acrylic (co) polymer (A). When the amount is less than 55% by weight of the total weight, a gloss reducing effect cannot be sufficiently obtained. When the amount exceeds the upper limit of 95% by weight, collection as powder when manufacturing tends to become difficult.

A gloss reducing effect appears due to this extremely hard and high molecular weight component. The greater the amount of methyl methacrylate and the value of specific viscosity within high molecular weight acrylic (co)polymer (A), and the content of this component is, the greater the gloss reducing effect.

In addition, the structure of the high molecular weight acrylic (co)polymer (A) is preferably a one-step polymer or a multi-step polymer of at least two or more steps, more preferably a multi-step polymer with at least two steps. In order to provide facilitated productivity, handling and moldability while internally including a polymer layer of high specific viscosity, effectual for low gloss, softening or lowering the molecular weight of the minor components by creating 2 steps is effective.

The high molecular weight acrylic (co)polymer (A) can be produced by emulsion polymerization, suspension polymerization, bulk polymerization, solution polymerization and the like. Of these, emulsion polymerization is particularly preferred, from the viewpoint of easily obtaining high molecular weight polymers.

The high molecular weight acrylic (co)polymer (A) can also be created systematically in the polymerization step of impact modifier (C). For example, a technique, such as incorporating some sort of ingenuity when polymerizing the outermost layer of impact modifier (C), and obtaining a non-crosslinked high molecular weight (co)polymer (A) with a specific viscosity of at least 0.5, is possible.

The amount of the high molecular weight acrylic (co) polymer (A) within the acrylic resin composition is 10 to 40 parts by weight, more preferably 12 to 37 parts by weight, most preferably 15 to 35 parts by weight. When the amount is less than 10 parts by weight, a gloss reducing effect cannot be sufficiently obtained and when greater than 40 parts by weight, processability diminishes.

Below is a description of acrylic (co)polymer (B).

The acrylic (co)polymer (B) can be obtained by copolymerizing methyl methacrylate and a monomer copolymerizable therewith. Specifically, it is obtained by copolymerizing 50 to 100% by weight of methyl methacrylate and 0 to 50% by weight of a monomer copolymerizable therewith. When the amount of methyl methacrylate is less than 50% by weight, the outcome is not favorable, as it results in a decrease in weatherability and hardness. The amount of methyl methacrylate is preferably 60 to 90% by weight, more preferably 70 to 85% by weight.

As monomers which are copolymerizable with methyl methacrylate, examples given in the description of the high molecular weight acrylic (co)polymer (A) are acceptable.

The specific viscosity of the acrylic (co)polymer (B) is less than 0.5, more preferably less than 0.35, most preferably less than 0.25. By setting the specific viscosity less than 0.5, furthermore less than 0.25, a compound with excellent processability can be obtained.

The acrylic (co)polymer (B) can be produced by emulsion polymerization, suspension polymerization, bulk polymerization, solution polymerization and the like. Of these, bulk polymerization is particularly preferred from the viewpoint of decreasing the content of impurity in the polymer.

The amount of acrylic (co)polymer (B) within the acrylic resin composition is 0 to 80 parts by weight, more preferably 20 to 75 parts by weight, most preferably 25 to 65 parts by weight. When the amount exceeds 80 parts by weight, a gloss reducing effect cannot be sufficiently obtained.

Below is a description of impact modifier (C) with a multilayer structure.

The impact modifier (C) with a multilayer structure is a polymer having a multilayer structure, which is obtained by polymerizing a vinyl monomer in a single stage or in two or more stages in the presence of particles of a rubbery polymer. The rubbery polymer includes, for instance, an acrylic rubber, a diene rubber, a silicone rubber and the like. Examples of the acrylic rubber are, for instance, butyl acrylate-based rubber, n-octyl acrylate-based rubber, 2-ethylhexyl acrylate-based rubber, and the like. Examples of the diene rubber are, for instance, polybutadiene rubber, isoprene rubber, SBR, NBR, and the like. Examples of the silicone rubber are dimethyl siloxane rubber, phenyl methyl siloxane rubber and the like. Of these, acrylic rubbers are preferred from the viewpoint that they do not decrease the weatherability of the obtained resin composition. In general, these rubbers are used in the form of crosslinked rubber. Preferable examples of crosslinkable monomers for forming a crosslinked structure are allyl methacrylate, allyl acrylate, diallyl maleate, diallyl fumarate, diallyl itaconate, monoallyl maleate, butadiene, divinyl benzene, and the like. These may be used alone or in combination with two or more kinds.

The impact modifier (C) with a multilayer structure is preferably a polymer of a two layer structure, prepared by polymerizing 80 to 5% parts by weight of a copolymerizable vinyl monomer in either one or at least two or more steps, in the presence of 20 to 95% parts by weight of crosslinked acrylic rubber particles. The amount of crosslinked rubber particles more preferably are 30 to 85% parts by weight, most preferably 40 to 80% parts by weight. When the amount of the crosslinked acrylic rubber particles is below or exceeds this range, the results tend to be undesirable from the viewpoint of processability and weatherability.

The average particle size of the aforesaid polymer measured by light scattering at a wavelength of 546 nm is preferably 300 to 4000 Å. When less than 300 Å or greater than 4000 Å, sufficient impact resistance cannot be obtained.

Examples of the copolymerizable vinyl monomer to be polymerized in the presence of the rubber polymer particles are, for instance, methyl methacrylate, ethyl methacrylate, methyl acrylate, ethyl acrylate, butyl acrylate, styrene, acrylonitrile, and the like.

The copolymerizable monomer comprises preferably 50 to 100% by weight of methyl methacrylate and 50 to 0% by weight of another copolymerizable monomer, more preferably 65 to 98% by weight of methyl methacrylate and 35 to 2% by weight of another copolymerizable monomer. When the amount of methyl methacrylate is less than 50% by weight, compatibility with high moleular weight acrylic (co)polymer (A) and acrylic (co)polymer (B) tends to become poor and the dispersibility of impact modifier (C) tends to go down.

This two layer structure is preferred from the viewpoints that collection as powder is made easier and the dispersibility of the impact modifier within the resin composition is increased.

The crosslinked rubber particles may further contain a hard polymer in the inner layer as a core of the particle. Easier maintenance of the hardness of the acrylic resin composition is a benefit of using a hard polymer as the core.

The hard polymer as the core is preferably a two layer polymer obtained from polymerizing a monomer mixture of an acrylic ester, another copolymerizable monomer and a crosslinkable monomer in the presence of the inner layer polymer made by polymerizing methyl methacrylate, another copolymerizable monomer, and a crosslinkable monomer.

The two layer polymer as the core is also preferably made by polymerizing 30 to 80 parts by weight of a monomer mixture of 50 to 99.9% by weight of an acrylic ester, 49.9 to 0% by weight of another copolymerizable monomer and 0.1 to 5% by weight of a crosslinkable monomer, in the presence of 10 to 40 parts by weight of an inner layer polymer made by polymerizing 40 to 99.9% by weight of methyl methacrylate, 59.9 to 0% by weight of a copolymerizable monomer and 0.1 to 5% by weight of a crosslinkable monomer. Furthermore, it is preferable that 100 parts by weight of a three layer polymer is prepared by polymerizing 10 to 60 parts by weight of a monomer mixture comprising 50 to 100% by weight of methyl methacrylate and 50 to 0% by weight of a copolymerizable monomer, in the presence of the two layer polymer.

More preferably, the methyl methacrylate of the inner layer polymer, which is the first layer, is 45 to 99.9% by weight. When the amount of methyl methacrylate is less than 45% by weight, the hardness of the acrylic resin composition cannot be maintained.

The amount of the inner layer polymer of the three layer structure polymer is preferably 15 to 35 parts by weight based on the 100 parts by weight of the three layer structure polymer. When the amount is less than 10 parts by weight, the hardness of the acrylic resin composition cannot be maintained and when greater than 40 parts by weight, the impact modifying effect tends to be insufficient.

The amount of the acrylic ester of the second layer is preferably 70 to 99.9% by weight. The impact modifying effect tends to be insufficient when the amount of acrylic ester is less than 50% by weight.

The amount of the monomer mixture of the second layer of the three layer structure polymer is more preferably 40 to 70 parts by weight based on the 100 parts by weight of the three layer structure polymer. When the amount is less than 30 parts by weight, the impact modifying effect tends to be insufficient, and when the amount is greater than 80 parts by weight, the first and third layers diminish, the molded articles lack hardness and the three layer structure polymer tends to be defective dispersion-wise.

The average particle size of the aforesaid polymer measured by light scattering at a wavelength of 546 nm is preferably 300 to 4,000 Å. When less than 300 Å or greater than 4,000 Å, sufficient impact resistance cannot be obtained.

The amount of the methyl methacrylate of the third layer is preferably 65 to 98% by weight. When the amount of methyl methacrylate is less than 50% by weight, compatibility with high molecular weight acrylic (co)polymer (A) and acrylic (co)polymer (B) tends to become poor, and the dispersibility of the impact modifier tends to be defective.

The monomer mixture of the third layer of the three layer structure polymer is more preferably 15 to 50 parts by weight based on 100 parts by weight of the three layer structure polymer. When less than 10 parts by weight, dispersibility of the impact modifier tends to be defective, and when greater than 60 parts by weight, the impact modifying effect tends to be insufficient.

The polymerization for the three layer structure polymer is conducted by emulsion polymerization, suspension polymerization, bulk polymerization, solution polymerization and the like. Emulsion polymerization method is particularly preferred from the viewpoint that polymer structure can be controlled with ease.

The amount of the multilayer structure impact modifier (C) within the acrylic resin composition is 10 to 90 parts by weight, more preferably 15 to 70 parts by weight, most preferably 20 to 60 parts by weight. When the amount is less than 10 parts by weight, sufficient impact resistance cannot be attained, and when greater than 90 parts by weight, a gloss reducing effect cannot be sufficiently obtained.

Also, two or more types of impact modifier (C) may be used in the acrylic resin composition.

The melt flow index of the acrylic resin composition is 0.35 to 1.4 g/10 min., more preferably 0.4 to 1.2 g/10 min., most preferably 0.6 to 1.3 g/10 min. When the melt flow index is less than 0.35 g/10 min., due to high viscosity, there is concern of processing becoming difficult, and a great deal of residual stress remains on the molded article, resulting in post-molding deformation. When greater than 1.4 g/10 min., the gloss reducing effect does not appear fully.

In these blending methods, each part may be mixed as the solid matter retrieved, or may be mixed in the form of latex and the like before the collection.

The processing method may be the usual method used in extrusion molding. However, when obtaining a laminated molded article, a device using a multi-manifold die is preferable, since each layer is less subject to the rheology characteristics of other layers and thus a good molded article can be prepared.

A siding panel, window profile and the like comprising a capstock made from the acrylic resin composition of the present invention and a vinyl chloride resin substrate, can be manufactured.

As a gloss reducing agent, an organic gloss reducing agent such as crosslinked high molecules or an inorganic gloss reducing agent such as silica may be used together when necessary and an embossing process may also be conducted in combination.

When required, additives such as antioxidants, light stabilizers, lubricants, pigments and the like may be added to the acrylic resin composition of the present invention.

The present invention is explained in detail through Examples and Comparative Examples below, but the present invention is not limited thereto.

EXAMPLE 1

Preparation of Two Layer Impact Modifier (C)

(a) Preparation of Rubbery Polymer

A glass reactor was charged with a mixture of the following composition. While stirring was carried out under nitrogen stream, the temperature was elevated to 50° C. Thereto was added dropwise a monomer mixture comprising 100 parts of n-butyl acrylate, 1 part of allyl methacrylate and 0.1 part of cumene hydroperoxide over 4 hours. With the addition of the monomer mixture, a 5% aqueous solution obtained by dissolving 2 parts of potassium stearate was continuously added thereto over 4 hours. After the completion of the addition, stirring was continued for 1.5 hours to complete the polymerization. The polymerization conversion was 98% [(amount of polymer produced/amount of monomer charged)×100]. The average particle size of the obtained polymer was 700 Å (measured by using light scattering at a wavelength of 546 nm).

Mixture:

|  | part |
| --- | --- |
| Deionized water | 250.0 |
| Potassium stearate | 0.5 |
| Formaldehyde sodium sulfoxylate | 0.2 |
| Disodium ethylenediaminetetraacetate | 0.01 |
| Ferrous sulfate hepahydrate | 0.005 |

(b) Preparation of Outer Layer

A glass reactor was charged with 75 parts (solid content) of the crosslinked rubber polymer latex obtained in (a), 0.05 part of formaldehyde sodium sulfoxylate, 0.01 part of disodium ethylenediaminetetraacetate and 0.005 part of ferrous sulfate hepahydrate. The aqueous dispersion was heated and stirred under nitrogen stream at 50° C. Thereto were continuously added over 1 hour 20 parts of methyl methacrylate and 5 parts of butyl methacrylate as monomer components for graft polymerization and 0.05 part by weight of cumene hydroperoxide as a polymerization initiator. After the completion of the addition, 0.01 part of cumene hydroperoxide was added and stirring was continued for two hours to complete the polymerization. The polymerization conversion was 99%. The obtained multilayer graft copolymer latex was subjected to salting out for coagulation, heat treatment and drying in a known manner to give a white powder of the multilayer graft copolymer.

Preparation of Three Layer Impact Modifier (C)

(a) Polymerization for Innermost Layer

A glass reactor was charged with a mixture having the following composition. After elevating the temperature to 80° C. with stirring in a nitrogen stream, 25% of a liquid mixture of innermost layer components comprising 25 parts of methyl methacrylate, 0.1 part of allyl methacrylate and 0.1 part of t-butyl hydroperoxide was added all at once to the reactor, and the polymerization was carried out for 45 minutes.

Mixture:

|  | part |
| --- | --- |
| Deionized water | 220.0 |
| Boric acid | 0.3 |
| Sodium carbonate | 0.03 |
| N-Lauroylsarcosine sodium salt | 0.09 |
| Formaldehyde sodium sulfoxylate | 0.09 |
| Disodium ethylenediaminetetraacetate | 0.006 |
| Ferrous sulfate hepahydrate | 0.002 |

Subsequently, the remaining 75% of the mixture was continuously added to the reactor over 1 hour. After the completion of the addition, the reaction system was kept at 80° C. for 2 hours to complete the polymerization. During this period, 0.2 part of N-lauroylsarcosine sodium salt was added. The polymer particles in the obtained latex of the innermost layer crosslinked methacrylic polymer had an average particle size of 1,600 Å (measured by using light scattering at a wavelength of 546 nm). The polymerization conversion was 98%.

(b) Polymerization for Rubbery Polymer

After keeping the crosslinked methacrylic polymer latex obtained in (a) at 80° C. in a nitrogen stream and adding 0.1 part of potassium persulfate thereto, a monomer mixture of 41 parts of n-butyl acrylate, 9 parts of styrene and 1 part of allyl methacrylate was continuously added to the latex over 5 hours. During this period, a total of 0.1 part of potassium oleate was added in three installments. After the completion of the addition of the monomer mixture, 0.05 part of potassium persulfate was further added and the reaction system was kept for 2 hours to complete the polymerization. The obtained polymer had an average particle size of 2,300 Å, and the polymerization conversion was 99%.

(c) Polymerization for Outermost Layer

The rubbery polymer latex obtained in (b) was kept at 80° C. After adding 0.02 part of potassium persulfate thereto, a monomer mixture of 24 parts of methyl methacrylate, 1 part of n-butyl acrylate and 0.1 part of t-dodecylmercaptan was continuously added to the latex over 1 hour. After the completion of the addition of the monomer mixture, the reaction system was further kept for 1 hour to give a latex of a graft copolymer with a multilayer structure. The graft copolymer with a multilayer structure had an average particle size of 2,530 Å, and the polymerization conversion was 99%. The obtained multilayer graft copolymer latex was subjected to salting out for coagulation, heat treatment and drying in a known manner to give a white powder of the multilayer graft copolymer.

Preparation of High Molecular Acrylic (co)polymer (A)

A reactor equipped with a stirrer was charged with 200 parts of water, 1 part of dioctyl sodium sulfosuccinate and 0.2 part of potassium persulfate. In the reactor, oxygen in the vacant space and water was removed by passing nitrogen, and the temperature of the content was elevated to 65° C. with stirring. Thereto was added 80 parts of methyl methacrylate (as a first step monomer) over four hours followed by an hour of heating and stirring to complete the polymerization substantially. The latex was taken out and dried, and the specific viscosity of the latex was measured to be 0.929. Then a monomer mixture (as a second step monomer mixture) comprising 12 parts of butyl acrylate and 8 parts of methyl methacrylate was added thereto over 1 hour, and the reaction system was maintained at 65° C. for an hour and a half and cooled as it is. The polymerization conversion was 99%. The obtained copolymer latex was subjected to salting out for coagulation, heat treatment and drying in a known manner to give a white powder. The specific viscosity of the resin was 1.041.

Preparation of Acrylic (co)polymer (B)

A reactor equipped with a stirrer was charged with 240 parts of water and 15 parts of a 3% PVA aqueous solution (KH-17, available from Nippon Synthetic Chemical Industry Co., Ltd.), and the air inside the reactor was replaced with nitrogen. After elevating the temperature to 50° C., a monomer mixture of 75 parts of methyl methacrylate, 25 parts of butyl acrylate and 4 parts of t-dodecyl mercaptan in which 0.5 part of lauroyl peroxide and 0.5 part of benzoyl peroxide were dissolved was added thereto. Then the reaction was continued with elevating the temperature gradually, i.e., 60° C. for 2 hours, 70° C. for 2 hours, 80° C. for 2 hours and 90° C. for 1 hour, to complete the polymerization. The polymerization conversion was 99%. The obtained copolymer latex was subjected to dehydration and drying in a known manner to give a white powder. The specific viscosity of the resin was 0.295.

Preparation of Acrylic Resin Composition 0.5 part of titanium oxide, 0.5 part of a ultraviolet absorber (Tinuvin-P made by Ciba Specialty Chemicals K.K. Japan) and 0.2 part of polyolefin wax (ACPE-629A available from Allied Signal Inc.) were added to 100 parts in total of a mixture comprising 25 parts of the obtained two layer impact modifier (C), 10 parts of the three layer impact modifier (C), 15 parts of the high molecular weight acrylic (co)polymer (A) and 50 parts of the acrylic (co)polymer (B). The resulting mixture was pelletized using a twin screw extruder.

The pellet obtained by using twin screw extruder was formed into a sheet of 12.5 cm wide and 1 mm thick.

The melt flow index (at 230° C. under a load of 3.8 kg according to ASTM D-1238), Gardner impact strength (at 23° C., 8 lbs, unit: inch.lb/mil according to ASTM D-4226) and gloss (ASTM D-523, measuring angle: 75° C.) of the obtained pellet and sheet were measured. The results are shown in Table 1.

EXAMPLES 2 TO 4 AND COMPARATIVE
EXAMPLE 1 TO 4

Preparation of High Molecular Weight Acrylic (co)polymer (A)

The composition of the high molecular weight acrylic (co)polymer (A) is shown in Table 2.

EXAMPLE 2

The first step monomer of Example 1 was changed to a monomer mixture comprising 68 parts of methyl methacrylate and 12 parts of butyl acrylate. The specific viscosity after the completion of the first step polymerization was 0.838 and the specific viscosity after the completion of the second step polymerization was 1.479.

Preparation of Resin Composition 0.5 part of titanium oxide, 0.5 part of a ultraviolet absorber (Tinuvin-P made by Ciba Specialty Chemicals K. K. Japan) and 0.2 part of polyolefin wax (ACPE-629A available from Allied Signal Inc.) were added to 100 parts in total of a mixture comprising 15 parts of the above high molecular weight acrylic (copolymer (A), 25 parts of the two layer impact modifier (C) and 10 parts of the three layer impact modifier (C) prepared in Example 1, and 50 parts of the acrylic (co)polymer (B). The resulting mixture was kneaded and pelletized by using a twin screw extruder.

Sheets were prepared from the pellets and evaluated in the same manner as in Example 1. The results are shown in Table 1.

EXAMPLE 3

The amount of potassium persulfate before the addition of the first monomer mixture in Example 2 was changed to 0.25 part. The specific viscosity after the completion of the first step polymerization was 0.723 and the specific viscosity after the completion of the second step polymerization was 1.032. Pellets and sheets were prepared and evaluated in the same manner as in Example 2. The results are shown in Table 1.

EXAMPLE 4

The amount of potassium persulfate before the addition of the first step monomer in Example 1 was changed to 0.5 part, and the first step monomer was changed to a mixture of 60 parts of methyl methacrylate and 20 parts of butyl acrylate. In addition, 0.1 part of potassium persulfate was added before the addition of the second step monomer, and the second step monomer was changed to a mixture of 14 parts of methyl methacrylate and 6 parts of butyl acrylate. The specific viscosity after the completion of the first step polymerization was 0.611 and the specific viscosity after the completion of the second step polymerization was 0.697. Pellets and sheets were prepared and evaluated in the same manner as in Example 2. The results are shown in Table 1.

Comparative Example 1

The amount of potassium persulfate before the addition of the first step monomer in Example 4, was changed to 1.0 part. The specific viscosity after the completion of the first step polymerization was 0.357 and the specific viscosity after the completion of the second step polymerization was 0.384. Pellets and sheets were then prepared and evaluated in the same manner as in Example 2. The results are shown in Table 1.

Comparative Example 2

The amount of potassium persulfate before the addition of the first step monomer in Example 4 was changed to 0.25 part. In addition, the second step monomer was changed to a mixture of 8 parts of methyl methacrylate and 12 parts of butyl acrylate. The specific viscosity after the completion of the first step polymerization was 0.670 and the specific viscosity after the completion of the second step polymerization was 1.259. Pellets and sheets were then prepared and evaluated in the same manner as in Example 2. The results are shown in Table 1.

Comparative Example 3

The amount of potassium persulfate before the addition of the first step monomer in Example 4 was changed to 0.25 part, the first step monomer was changed to a mixture of 56 parts of methyl methacrylate and 24 parts of butyl acrylate, and the second step monomer was changed to a mixture of 18 parts of methyl methacrylate and 2 parts of butyl acrylate. The specific viscosity after the completion of the first step polymerization was 0.692 and the specific viscosity after the completion of the second step polymerization was 0.820. Pellets and sheets were then prepared and evaluated in the same manner as in Example 2. The results are shown in Table 1.

Comparative Example 4

The amount of potassium persulfate before the addition of the first step monomer in Example 4 was changed to 0.25 part, the first step monomer was changed to a mixture of 37.5 parts of methyl methacrylate and 12.5 parts of butyl acrylate. In addition, the amount of potassium persulfate before the addition of the second step monomer was changed to 0.2 part and the second step monomer was changed to a mixture of 35 parts of methyl methacrylate and 15 parts of butyl acrylate. The specific viscosity after the completion of the first step polymerization was 0.664 and the specific viscosity after the completion of the second step polymerization was 0.785. Pellets and sheets were then prepared and evaluated in the same manner as in Example 2. The results are shown in Table 1.

Comparative Example 5

0.5 part of titanium oxide, 0.5 part of a ultraviolet absorber (Tinuvin-P made by Ciba Specialty Chemicals K. K. Japan) and 0.2 part of polyolefin wax (ACPE-629A available from Allied Signal Inc.) were added to 100 parts in total of a mixture comprising 50 parts of the high molecular weight acrylic (co)polymer (A) of Example 1, 26 parts of the two layer impact modifier (C) of Example 1, 4 parts of the three layer impact modifier (C), and 20 parts of the acrylic (co)polymer (B). The resulting mixture was kneaded and pelletized using a twin screw extruder.

Sheets were prepared from the pellets and evaluated in the same manner as in Example 1. The results are shown in Table 1.

Comparative Example 6

0.5 part of titanium oxide, 0.5 part of a ultraviolet absorber (Tinuvin-P made by Ciba Specialty Chemicals K. K. Japan) and 0.2 part of polyolefin wax (ACPE-629A available from Allied Signal Inc.) were added to 100 parts in total of a mixture comprising 8 parts of the high molecular weight acrylic (co)polymer (A) of Example 1, 8 parts of the two layer impact modifier (C) of Example 1, 14 parts of the three layer impact modifier (C) and 70 parts of the acrylic (co)polymer (B). The resulting mixture was kneaded and pelletized using a twin screw extruder.

Sheets were prepared from the pellets and evaluated in the same manner as in Example 1. The results are shown in Table 1.

TABLE 1

|  | Ex. | | | | Com. Ex. | | | | | |
| --- | --- | --- | --- | --- | --- | --- | --- | --- | --- | --- |
|  | 1 | 2 | 3 | 4 | 1 | 2 | 3 | 4 | 5 | 6 |
| High molecular weight acrylic (co)polymer (A) (part) | 15 | 15 | 15 | 15 | 15 | 15 | 15 | 15 | 50 | 8 |
| Two layer impact modifier (C) (part) | 25 | 25 | 25 | 25 | 25 | 25 | 25 | 25 | 26 | 8 |

TABLE 1-continued

|  | Ex. | | | | Com. Ex. | | | | | |
| --- | --- | --- | --- | --- | --- | --- | --- | --- | --- | --- |
|  | 1 | 2 | 3 | 4 | 1 | 2 | 3 | 4 | 5 | 6 |
| Three layer impact modifier (C) (part) | 10 | 10 | 10 | 10 | 10 | 10 | 10 | 10 | 4 | 14 |
| Acrylic (co)polymer (B) (part) | 50 | 50 | 50 | 50 | 50 | 50 | 50 | 50 | 20 | 70 |
| MFI (g/10 min.) | 0.67 | 0.48 | 0.77 | 1.21 | 1.06 | 0.93 | 1.49 | 1.13 | 0.01 | 2.05 |
| Gloss | 37 | 31 | 33 | 36 | 76 | 77 | 58 | 49 | 41 | 69 |
| Gardner strength (in-lb/mil) | 0.75 | 0.96 | 1.09 | 0.80 | 0.78 | 0.88 | 0.75 | 0.98 | 0.55 | 0.24 |
| ShoreD | 73 | 73 | 73 | 73 | 72 | 72 | 73 | 73 | 67 | 75 |
| Processability | Better | Better | Better | Better | Better | Better | Better | Better | Worse | Better |

TABLE 2

| High molecular weight acrylic (co)polymer (A) | | | | | | | | |
| --- | --- | --- | --- | --- | --- | --- | --- | --- |
|  | Ex. | | | | Com. Ex. | | | |
|  | 1 | 2 | 3 | 4 | 1 | 2 | 3 | 4 |
| First step |  |  |  |  |  |  |  |  |
| Amount (%) | 80 | 80 | 80 | 80 | 80 | 80 | 80 | 50 |
| Amount of MMA (%) | 100 | 85 | 85 | 75 | 75 | 75 | 70 | 75 |
| Specific viscosity | 0.929 | 0.838 | 0.723 | 0.611 | 0.357 | 0.670 | 0.692 | 0.664 |
| Total |  |  |  |  |  |  |  |  |
| Amount of MMA (%) | 88 | 76 | 76 | 74 | 74 | 68 | 74 | 72.5 |
| Specific viscosity | 1.041 | 1.479 | 1.032 | 0.697 | 0.384 | 1.259 | 0.820 | 0.785 |

EXAMPLE 5

Preparation of Two Layer Impact Modifier (C)

(a) Preparation of Rubbery Polymer

A glass reactor was charged with a mixture of the following composition. While stirring was carried out under nitrogen stream, the temperature was elevated to 45° C. Thereto was added dropwise a monomer mixture comprising 30 parts of n-butyl acrylate, 0.45 part of allyl methacrylate and 0.05 part of cumene hydroperoxide over 2 hours. After 70 minutes and 2 hours from the start of the addition of the monomer mixture, 0.2 part each of potassium stearate was added. After the completion of the addition, stirring was continued for 1 hour to complete the polymerization. The polymerization conversion was 98% [(amount of polymer produced/amount of monomer charged)×100]. The average particle size of the obtained polymer was 690 Å (measured by using light scattering at a wavelength of 546 nm).

Mixture:

|  | part |
| --- | --- |
| Deionized water | 180.0 |
| Dodecyl sodium sulfate | 0.4 |
| Formaldehyde sodium sulfoxylate | 0.25 |
| Disodium ethylenediaminetetraacetate | 0.002 |
| Ferrous sulfate hepahydrate | 0.0012 |

(b) Preparation of Outer Layer

To the latex obtained in (a) was added 0.2 part of potassium stearate; 56 parts of methyl methacrylate and 14 parts of butyl methacrylate as a monomer component for graft polymerization; 0.45 part of n-dodecyl mercaptan; and 0.05 part of cumene hydroperoxide as a polymerization initiator over 3.5 hours. After 1 hour, 2 hours and 3 hours after the start of the addition of the monomer mixture, 0.2 part each of potassium stearate was added. After the completion of the addition, 0.1 part of cumene hydroperoxide was added thereto and stirring was continued for 2 hour to complete the polymerization. The polymerization conversion was 99%. The obtained multilayer graft copolymer latex was subjected to salting out for coagulation, heat treatment and drying in a known manner to give a white powder of the multilayer graft copolymer.

Preparation of Resin Composition 0.5 parts of titanium oxide, 0.5 part of a ultraviolet absorber (Tinuvin-P made by Ciba Specialty Chemicals K.K. Japan) and 0.2 part of polyolefin wax (ACPE-629A available from Allied Signal Inc.) were added to 100 parts in total of a mixture comprising 70 parts of the obtained two layer impact modifier (C) and 30 parts of the high molecular weight acrylic (co)polymer (A) of Example 1. The resulting mixture was kneaded and pelletized using a twin screw extruder.

The pellet obtained by using twin screw extruder was formed into a sheet of 12.5 cm wide and 1 mm thick.

The melt flow index (at 230° C. under a load of 3.8 kg according to ASTM D-1238), Gardner impact strength (at 23° C., 8 lbs, unit: inch.lb/mil according to ASTM D-4226) and gloss (ASTM D-523, measuring angle: 75° C.) of the obtained pellet and sheet were measured. The results are shown in Table 3.

Comparative Example 7

Preparation of Resin Composition 0.5 parts of titanium oxide, 0.5 part of a ultraviolet absorber (Tinuvin-P made by Ciba Specialty Chemicals K.K. Japan) and 0.2 part of polyolefin wax (ACPE-629A available from Allied Signal Inc.) were added to 100 parts of the two layer impact modifier (C) of Example 5. The resulting mixture was kneaded and pelletized using a twin screw extruder.

Sheets were prepared from the pellets and evaluated in the same manner as in Example 5. The results are shown in Table 3.

TABLE 3

|  | Ex. 5 | Com. Ex. 7 |
| --- | --- | --- |
| High molecular weight acrylic (co)polymer (A) | 30 | 0 |
| Two layer impact modifier (C) | 70 | 100 |
| Acrylic (co)polymer (B) | 0 | 0 |
| MFI (g/10 min) | 0.51 | 1.17 |
| Gloss | 40 | 75 |
| Gardner strength (in-lb/mil) | 0.74 | 0.80 |
| Shore D | 75 | 73 |
| Processability | better | better |

INDUSTRIAL APPLICABILITY

By using the acrylic resin composition of the present invention, a molded article with excellent weatherability, impact resistance, processability and low gloss can be obtained.

What is claimed is:

1. An acrylic resin composition comprising,
   (A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, said (co)polymer having a specific viscosity of at least 0.5 (solvent: toluene, concentration: 0.4%, temperature: 30° C.), wherein polymer layer obtained in one of the steps contains at least 72% by weight of methyl methacrylate, has a specific viscosity of at least 0.5 and makes up at least 55% by weight of the total weight of said high molecular weight acrylic (co)polymer (A);
   (B) 0 to 80 parts by weight of an acrylic (co)polymer containing 50 to 100% by weight of methyl methacrylate and 0 to 50% by weight of a copolymerizable monomer, said acrylic (co)polymer having a specific viscosity of less than 0.5;
   (C) 10 to 90 parts by weight of an impact modifier with a multilayer structure,
   wherein the total of (A), (B) and (C) is 100 parts by weight and said composition has a melt flow index of 0.35 g/10 minutes to 1.4 g/10 minutes (230° C., 3.8 kg load).

2. The composition of claim 1, wherein said composition comprises,
   12 to 37 parts by weight of said high molecular weight acrylic (co)polymer (A),
   25 to 75 parts by weight of said acrylic (co)polymer (B) and
   15 to 70 parts by weight of said impact modifier (C).

3. The composition of claim 1, wherein said composition comprises,
   15 to 35 parts by weight of said high molecular weight acrylic (co)polymer (A),
   25 to 65 parts by weight of said acrylic (co)polymer (B) and
   20 to 60 parts by weight of said impact modifier (C).

4. The composition of claim 1, wherein said composition comprises,
   15 to 35 parts by weight of said high molecular weight acrylic (co)polymer (A), said high molecular weight acrylic (co)polymer (A) having a specific viscosity of at least 0.6 and a polymer layer obtained in one of the steps having a specific viscosity of at least 0.6
   25 to 65 parts by weight of said acrylic (co)polymer (B) and
   20 to 60 parts by weight of said impact modifier (C),
   wherein the total of (A), (B) and (C) is 100 parts by weight.

5. The composition of claim 1, wherein said high molecular weight acrylic (co)polymer (A) is a one-step or multi-step polymer, and said polymer layer obtained in one of the steps has a specific viscosity of at least 0.6 and makes up 70% by weight of he total weight of said high molecular weight acrylic (co)polymer (A).

6. The composition of claim 1, wherein said high molecular weight acrylic (co)polymer (A) is a multi-step polymer and the step include at least two steps.

7. The composition of claim 1, wherein said impact modifier (C) is a polymer having two layer structure prepared by polymerizing 80 to 5 parts by weight of a monomer mixture comprising 50 to 100% by weight of a (meth)acrylic ester and 50 to 0% by weight of another copolymerizable monomer in the presence of 20 to 95 parts by weight a crosslinked acrylic rubber,
   wherein the total of the monomer mixture and the crosslinked acrylic rubber is 100 parts by weight.

8. The composition of claim 1, wherein said impact modifier (C) is a polymer having three layer structure prepared by polymerizing 10 to 60 parts y weight of a monomer mixture comprising 50 to 100% by weight of a (meth)acrylic ester an 50 to 0% by weight of a copolymerizable monomer,
   in the presence of a polymer having two layer structure,
   said polymer having two layer structure being obtained by polymerizing 3 to 80 parts by weight of a monomer mixture comprising 50 to 99.9% by weight of an acrylic ester, 49.9 to 0% by weight of another copolymerizable monomer and 0.1 to 5% by weight of crosslinkable monomer in the presence of 10 to 40 parts by weight of an inner layer polymer obtained by polymerizing 40 to 99.9% by weight of methyl methacrylate, 59.9 to 0% by weight of another copolymerizable monomer and 0.1 to 5% by weight of crosslinkable monomer,
   wherein the total of said monomer mixtures and said inner polymer is 100 parts by weight.

9. A molded article for capstock comprising a resin composition, wherein the resin composition comprises:
   (A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, said (co)polymer having a specific viscosity of at least 0.5 (solvent: toluene, concentration: 0.4%, temperature: 30° C.), wherein polymer layer obtained in one of the steps contains at least 72% by weight of methyl methacrylate, has a specific viscosity of at least 0.5 and makes up at least 55% by weight of the total weight of said high molecular weight acrylic (co)polymer (A);
   (B) 0 to 80 parts by weight of an acrylic (co)polymer containing 50 to 100% by weight of methyl methacrylate and 0 to 50% by weight of a copolymerizable monomer, said acrylic (co)polymer having a specific viscosity of less than 0.5;
   (C) 10 to 90 parts by weight of an impact modifier with a multilayer structure, wherein the total of (A), (B) and (C) is 100 parts by weight and said composition has a melt flow index of 0.35 g/10 minutes to 1.4 g/10 minutes (230° C. 3.8 ka load).

10. A molded article for capstock obtained by extruding a resin composition as a capstock by using a multi-manifold die, wherein the resin composition comprises;

(A) 10 to 40 parts by weight of a high molecular weight acrylic (co)polymer which is a one-step or multi-step polymer containing 72 to 100% by weight of methyl methacrylate and 0 to 28% by weight of a copolymerizable monomer said (co)polymer having a specific viscosity of at least 0.5 (solvent: toluene, concentration: 0.4%, temperature: 30° C.), wherein polymer layer obtained in one of the steps contains at least 72% by weight of methyl methacrylate, has a specific viscosity of at least 0.5 and makes up at least 55% by weight of the total weight of said high molecular weight acrylic (co)polymer (A);

(B) 0 to 80 parts by weight of an acrylic (co)polymer containing 50 to 100% by weight of methyl methacrylate and 0 to 50% by weight of a copolymerizable monomer, said acrylic (co)polymer having a specific viscosity of less than 0.5;

(C) 10 to 90 parts by weight of an impact modifier with a multilayer structure, wherein the total of (A), (B) and (C) is 100 parts by weight and said composition has a melt flow index of 0.35 g/10 minutes to 1.4 g/10 minutes (230° C. 3.8 kg load).

11. A siding panel comprising a capstock obtained from a resin composition and a substrate made of a vinyl chloride resin, wherein the resin composition comprises:

(A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, said (co)polymer having a specific viscosity of at least 0.5 (solvent: toluene, concentration: 0.4%, temperature: 30° C.), wherein polymer layer obtained in one of the steps contains at least 72% by weight of methyl methacrylate, has a specific viscosity of at least 0.5 and makes up at least 55% by weight of the total weight of said high molecular weight acrylic (co)polymer (A);

(B) 0 to 80 parts by weight of an acrylic (co)polymer containing 50 to 100% by weight of methyl methacrylate and 0 to 50% by weight of a copolymerizable monomer, said acrylic (co)polymer having a specific viscosity of less than 0.5:

(C) 10 to 90 parts by weight of an impact modifier with a multilayer structure, wherein the total of (A), (B) and (C) is 100 parts by weight and said composition has a melt flow index of 0.35 g/10 minutes to 1.4 g/10 minutes (230° C. 3.8 kg load).

12. A window profile comprising a capstock obtained from a resin composition and a substrate made of a vinyl chloride resin, wherein the resin composition comprises:

(A) 10 to 40 parts by weight of a high molecular weight acrylic (co)polymer which is a one-step or multi-step polymer containing 72 to 100% by weight of methyl methacrylate and 0 to 28% by weight of a copolymerizable monomer, said (co)polymer having a specific viscosity of at least 0.5 (solvent: toluene, concentration: 0.4%, temperature: 30° C.), wherein polymer layer obtained in one of the steps contains at least 72% by weight of methyl methacrylate, has a specific viscosity of at least 0.5 and makes up at least 55% by weight of the total weight of said high molecular weight acrylic (co)polymer (A);

(B) 0 to 80 parts by weight of an acrylic (co)polymer containing 50 to 100% by weight of methyl methacrylate and 0 to 50% by weight of a copolymerizable monomer, said acrylic (co)polymer having a specific viscosity of less than 0.5;

(C) 10 to 90 parts by weight of an impact modifier with a multilayer structure, wherein the total of (A), (B) and (C) is 100 parts by weight and said composition has a melt flow index of 0.35 g/10 minutes to 1.4 g/10 minutes (230° C. 3.8 kg load).

* * * * *

UNITED STATES PATENT AND TRADEMARK OFFICE
CERTIFICATE OF CORRECTION

PATENT NO. : 6,844,396 B2  Page 1 of 1
DATED : January 18, 2005
INVENTOR(S) : Takahiko Sugaya et al.

It is certified that error appears in the above-identified patent and that said Letters Patent is hereby corrected as shown below:

This certificate supersedes Certificate of Correction issued April 19, 2005, the number was erroneously mentioned and should be vacated since no certificate of correction was granted.

Signed and Sealed this

Seventeenth Day of January, 2006

JON W. DUDAS
*Director of the United States Patent and Trademark Office*